May 22, 1956     L. R. NELSON     2,746,799
SPRINKLERS

Filed March 30, 1954     2 Sheets—Sheet 1

INVENTOR
Lewen R. Nelson.

BY Stone, Boyden & Mack
ATTORNEYS.

May 22, 1956 — L. R. NELSON — 2,746,799
SPRINKLERS
Filed March 30, 1954 — 2 Sheets-Sheet 2
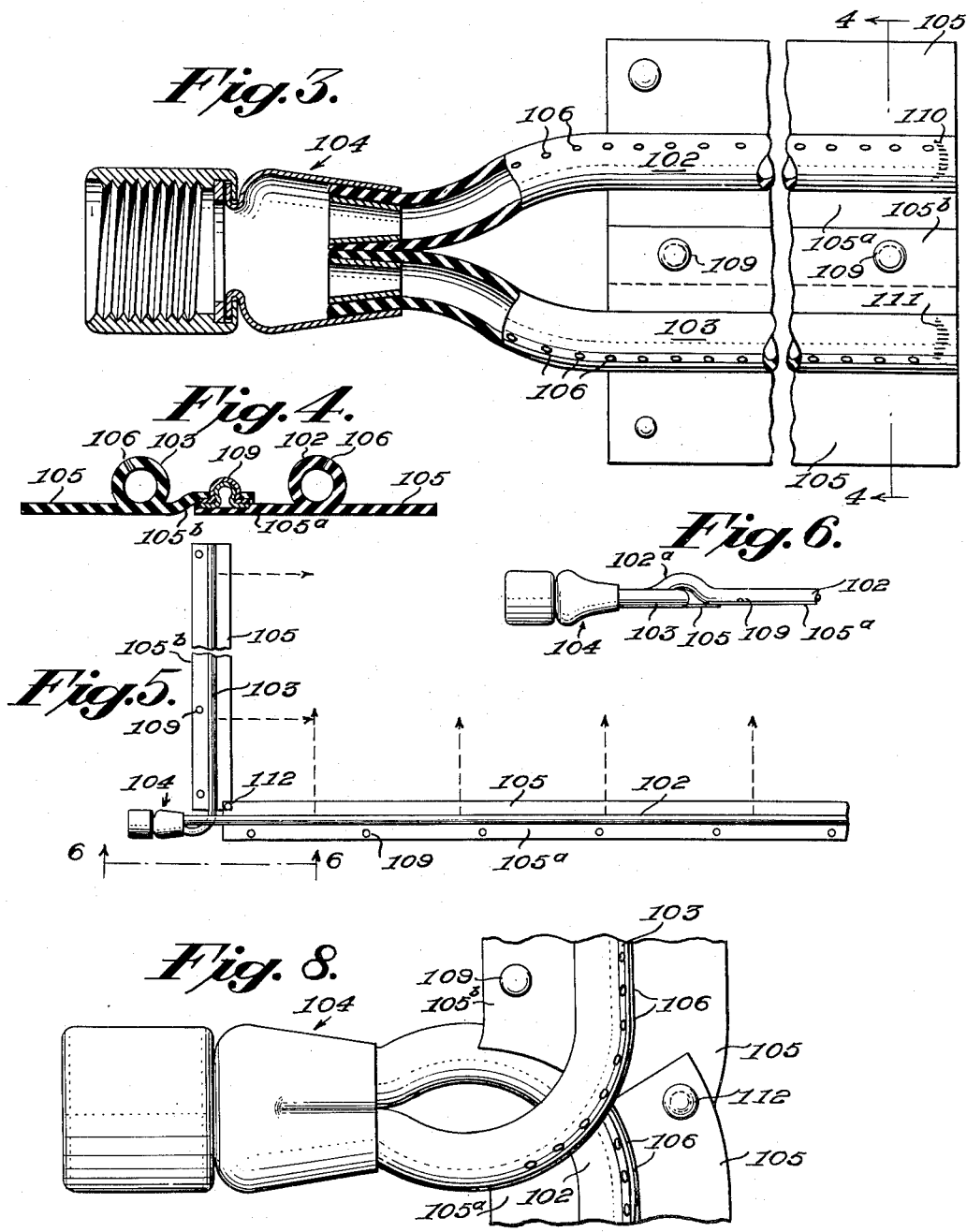
INVENTOR
Lewen R. Nelson
BY Stone, Boyden & Mack
ATTORNEYS

United States Patent Office 2,746,799
Patented May 22, 1956

2,746,799

SPRINKLERS

Lewen R. Nelson, Peoria, Ill.

Application March 30, 1954, Serial No. 419,687

6 Claims. (Cl. 299—104)

This invention relates to sprinklers and particularly to an improved flexible spray tube sprinkler. This application is a continuation-in-part of my copending application, Serial Number 411,923, filed February 23, 1954.

A particular advantage of the invention is provision of such a sprinkler capable of sprinkling a variety of ground area sizes and shapes. The invention also provides a sprinkler of the spray tube type adapted to water areas bordered by a straight line, so as to be useful in watering lawns adjacent to sidewalks and driveways. The invention is also characterized by provision of sprinkler constructions which are particularly inexpensive to manufacture and simple to use.

In order that these and other advantages of the invention may be understood in detail, reference is had to the accompanying drawing forming a part of this specification and wherein:

Fig. 3 is a plan view similar to Fig. 1 of another embodiment of the invention;

Fig. 4 is a sectional view taken on line 4—4, Fig. 3;

Fig. 5 is a plan view on reduced scale showing the device of Fig. 3 in one position of use;

Fig. 6 is a fragmentary side elevation of the device of Fig. 5 as seen on line 6—6, Fig. 5;

Fig. 8 is a fragmentary plan view of a portion of the device seen in Fig. 7.

Figure 2:
Fig. 2 is a sectional view taken on the line 2—2, Fig. 1.
Figure 1:
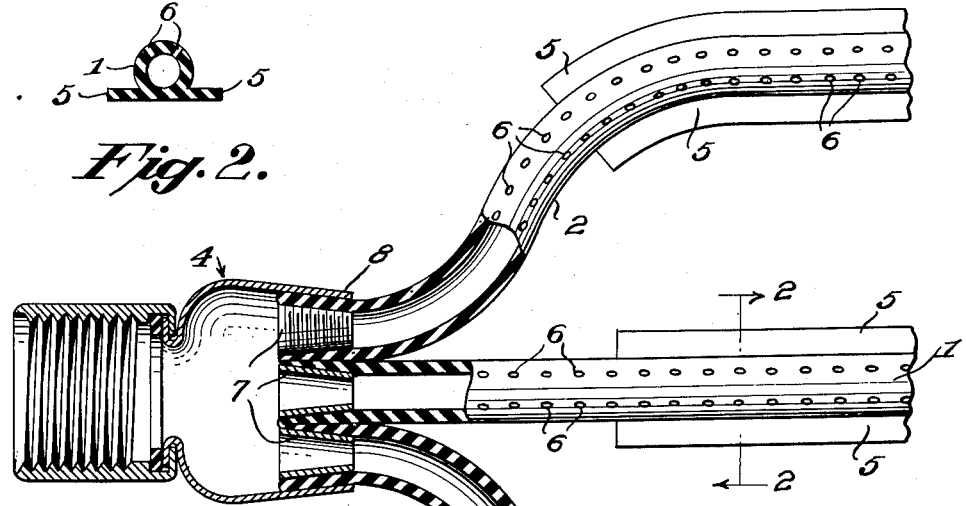
Fig. 1 is a partial plan view of a sprinkler constructed in accordance with one embodiment of the invention, parts being shown in section.

Referring now to the drawings in detail and first to Figs. 1 and 2, it will be seen that one embodiment of the invention comprises separate flexible water conducting conduits 1—3 the ends of which are embraced in watertight relation by a coupling 4 which may be of the type described and claimed in the aforesaid application Serial Number 411,923. Thus, the coupling 4 serves to connect the conduits 1—3 jointly to a single source of water under pressure, such as a silcock or a section of conventional hose.

The conduits 1—3 are continuous flexible tubes of rubber or plastic and are sufficiently flexible to be disposable, by the user, in various positions along the ground so as to select the ground area to be sprinkled. Each conduit is provided with ground-engaging means to prevent the conduit from twisting during use, and I prefer to employ as such anti-twisting means the base fins 5 formed integrally with the conduits and extending substantially continuously throughout the length thereof. Such base fins, extending laterally from the conduits, may be easily produced when the conduit is manufactured by conventional extrusion or like methods.

The conduits 1—3 are each provided with two series of longitudinally spaced radially directed discharge orifices 6, each series extending along a different side of the vertical longitudinal center plane of the conduits. As best seen in Fig. 2, the discharge orifices 6 are so disposed as to direct the spray upwardly and outwardly away from the tube.

The sprinkler illustrated in Figs. 1 and 2 may be used to springle an elongated area simply by aligning the conduits 1—3 on the ground side by side with the base fin 5 flush to the ground surface. In that event, the device functions somewhat the same as a conventional single spray type. However, when a relatively large ground area is to be springled, the outer or side tubes 2 and 3 are spaced laterally from the center tube 1, in the manner graphically illustrated in Fig. 1. Since ordinary house water service pressure will provide for a spray extending as much as 10 or 15 ft. from the sprinkler tubes, it will be readily understood that the device of Fig. 1 may be employed to spray a substantial ground area in one operation.

In order to obtain maximum flexibility of the tubes 2 and 3, so that these tubes may be readily spaced from the center tube 1, I prefer to terminate the base fins 5 at a point considerably removed from the coupling 4. While the details of the coupling form no part of the present invention, it will be understood that the tube ends in the coupling contain rigid tubular inserts 7 and that the compressible material of the tubes is compressed between these inserts and a specially shaped ferrule 8 so that the coupling is fully sealed to the conduits.

The outer or free end of the conduits 1—3 may be sealed in any suitable manner to maintain spray pressure in the conduits. Thus, the conduits may simply be pressed flat and sealed in that relation. On the other hand, the end of one or all of the conduits may be provided with a conventional threaded coupling member (not shown) to receive a correspondingly threaded closure cap. In that event, the closure cap may be removed and the conduit extended by attaching a second piece of conventional hose or a second conduit similar to the conduits 1—3.

Turning now to Figs. 3-8, it will be seen that the embodiment shown here includes a coupling 104 receiving the ends of a pair of flexible conduits 102 and 103 so as to connect the conduits jointly to a single source of fluid under pressure. The conduits 102 and 103 are again provided with ground-engaging base fins 105 to prevent the conduits from twisting. In this case, however, the adjacent fin portions 105a and 105b are adapted to overlap and are provided with separable fastening means, such as the conventional snap fasteners 109, for securing the overlapped fins or webs together when the conduits are arranged side-by-side, as seen in Figs. 3 and 4. In this manner, the two conduits or spray tubes are secured firmly together so that the fins of both conduits coact to give a firm ground engaging base.

Each of the conduits 102 and 103 is provided with a series of longitudinally spaced radially directed discharge orifices 106 positioned at one side of the vertical center plane of the respective conduits so as to discharge the sprays away from the overlapped fins 105a and 105b when the conduits are arranged side-by-side. The free ends of the conduits are closed, as by flattening and sealing at 110 and 111, Fig. 3, so that spray pressure will be maintained within the conduits. Alternatively, end couplings and closure caps may be employed as hereinbefore described.

In sprinkling a rectangular area, and particularly when it is desired to keep from wetting walks and the like intersecting at right angles, one of the conduits 102 and 103 may be crossed over the other, as seen in Fig. 5, so that the two conduits extend at right angles to each other and can be positioned along two sides of the rectangular area. When the conduits are thus crossed over each other, the spray is directed over a rectangular area two sides of which are defined by the conduits.

It will be noted that when the conduits are crossed over one of the conduits curves over the other, as at 102a, Fig. 6, and the corners of the fins 105 are brought into overlapping relation. To maintain the cross-over relationship, I provide on the corners of the fins 105 a pair of separable fastener elements 112 which may be secured together when the conduits are arranged as in Fig. 5, but are disengaged and lie on opposite sides of the sprinkler when the conduits are side-by-side as in Fig. 3. The fastener elements 112 may constitute a conventional snap fastener.

Figure 7:
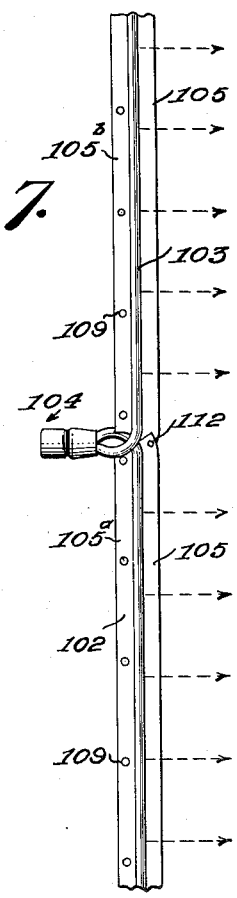
Fig. 7 is a plan view on reduced scale showing the device of Fig. 3 in another position of use.

In the arrangement of Fig. 5, one of the conduits is aligned with the coupling, so that the conduits lie at right angles. When it is necessary to sprinkle a longer area, both conduits may be bent near the coupling so as to extend at right angles to the coupling axis, as seen in Figs. 7 and 8. In this manner, both of the conduits may be disposed along the edge of a long sidewalk or the like, the placement of the radially directed discharge orifices 106 being such that all of the spray will be directed in one direction, away from the walk.

I claim:

1. In a sprinkler, the combination of a pair of fluid conducting conduits each provided with a series of longitudinally spaced discharge openings and a ground engaging base fin projecting laterally from the conduit and extending for a major portion of the length thereof, a single coupling for connecting said conduits jointly to a fluid supply, said conduits being flexible so as to be disposable side-by-side or at an angle to each other to adjust the ground area to be sprinkled, and separable fastening means carried by said fins to secure said conduits in side-by-side relation.

2. In a sprinkler, the combination of two fluid conducting conduits each provided with a series of longitudinally spaced radially directed discharge orifices; a single coupling for connecting said conduits jointly to a fluid supply; said conduits being flexible so as to be disposable side-by-side away from the coupling or crossed over one another to extend substantially at right angles to the axis of said coupling, said conduits being so connected to said coupling that said orifices direct fluid outwardly from the sprinkler when the conduits are arranged side-by-side; separable fastening means for connecting said conduits together throughout substantially their entire length when disposed side-by-side, and separable fastening means for connecting said conduits together substantially at the cross-over point when said conduits are crossed over one another.

3. In a sprinkler, the combination of a plurality of fluid conducting conduits each provided with a series of longitudinally spaced radially directed discharge openings, and a single unitary coupling engaged with all of said conduits for connecting the same jointly to a single fluid supply, said conduits being flexible and separate and independent of each other except for mutual engagement by said coupling, so as to be disposable either side-by-side or along divergent lines, and said conduits each being substantially smaller in diameter than said coupling whereby said conduits may be crossed one over the other at a point immediately adjacent said coupling, each of said conduits being provided with laterally extending stabilizing means distributed uniformly therealong, except for a length thereof immediately adjacent said coupling and including said point to prevent twisting thereof.

4. In a sprinkler, the combination of a plurality of fluid conducting conduits each provided with a series of longitudinally spaced discharge openings and with laterally projecting ground engaging means to prevent twisting thereof, a single unitary coupling engaged with said conduits for connecting the same jointly to a single fluid supply, said conduits being flexible and independent each from the other beyond said coupling so as to be disposable side-by-side or at an angle to each other to adjust the ground area to be sprinkled, and separable fastening means operatively connected to said conduits to secure the same together in side-by-side relation.

5. In a sprinkler, the combination of a plurality of mutually independent fluid conducting conduits each provided with a series of longitudinally spaced fluid discharge openings, and a single unitary coupling embracing ends of all of said conduits in fluid-tight relation for connecting said conduits to a single source of fluid supply, said conduits being flexible so as to be disposable either side-by-side or at angles to each other in positions diverging outwardly from said coupling, each of said conduits being provided with integral laterally extending base fins distributed throughout the conduit except for a length thereof immediately adjacent said coupling, such length being of smaller diameter than said coupling.

6. In a sprinkler, the combination of two fluid conducting conduits each provided with a series of longitudinally spaced radially directed discharge orifices located at one side of the longitudinal vertical center plane of the conduit, a single unitary coupling engaging both of said conduits in fluid-tight relation for connecting said conduits jointly to a fluid supply, said conduits being flexible and separate and independent of each other beyond said coupling so as to be disposable side-by-side or at an angle to each other to determine the ground area to be sprinkled, said conduits each having a uniform cross-section substantially smaller than that of said coupling whereby the conduits may readily be crossed one over the other at a point adjacent said coupling, and laterally extending stabilizing means uniformly distributed along each of said conduits except for a length thereof immediately adjacent said coupling, said conduits being so connected to said coupling that said series of discharge openings are oppositely directed when said conduits are arranged side-by-side.

References Cited in the file of this patent

UNITED STATES PATENTS

| | | |
|---|---|---|
| 1,173,771 | Cook | Feb. 29, 1916 |
| 2,070,665 | Lepper | Feb. 16, 1937 |
| 2,092,674 | Kennedy | Sept. 7, 1937 |
| 2,566,833 | Healy | Sept. 4, 1951 |
| 2,621,075 | Sedar | Dec. 9, 1952 |

FOREIGN PATENTS

| | | |
|---|---|---|
| 130,167 | Germany | May 1, 1902 |